Figure 4:
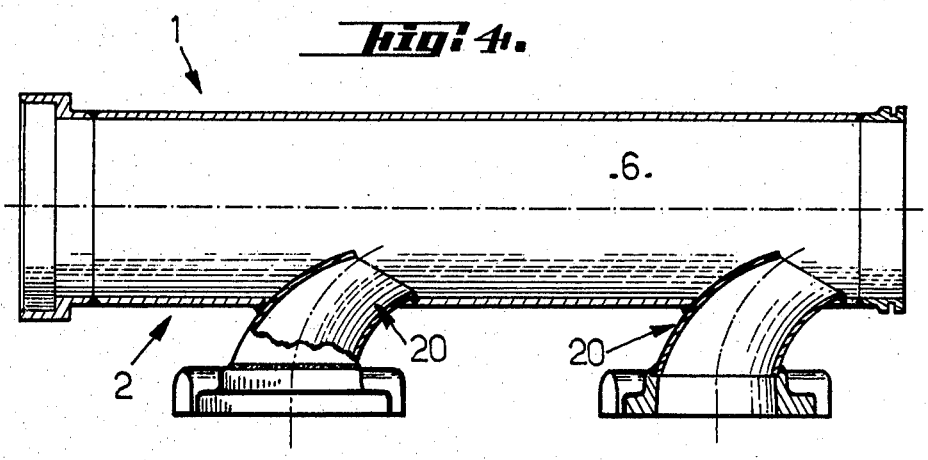

United States Patent [19]

Curtil

[11] 4,288,988
[45] Sep. 15, 1981

[54] METHOD AND APPARATUS FOR IMPROVING THE GAS FLOW IN AN INTERNAL COMBUSTION ENGINE EXHAUST MANIFOLD

[75] Inventor: Remi Curtil, Eaubonne, France

[73] Assignee: Societe d'Etudes de Machines Thermiques S.E.M.T., Saint-Denis, France

[21] Appl. No.: 870,465

[22] Filed: Jan. 18, 1978

[30] Foreign Application Priority Data

Jan. 24, 1977 [FR] France .............................. 77 01937

[51] Int. Cl.³ ...................... F02B 37/00; F02B 27/04; F01N 7/10
[52] U.S. Cl. ...................................... 60/605; 60/313; 60/323; 415/205
[58] Field of Search .................. 60/313, 323, 597, 598, 60/614, 605; 415/203, 205

[56] References Cited

U.S. PATENT DOCUMENTS

| | | | |
|---|---|---|---|
| 2,348,518 | 5/1944 | Birkigt | 60/323 X |
| 2,455,493 | 12/1948 | Jacobs | 60/323 X |
| 3,068,638 | 12/1962 | Birmann | 60/605 |
| 3,077,071 | 2/1963 | Leichtfuss | 60/323 X |
| 3,380,246 | 4/1968 | Dowell | 60/598 |

FOREIGN PATENT DOCUMENTS

| | | | |
|---|---|---|---|
| 842873 | 7/1952 | Fed. Rep. of Germany | 60/597 |
| 662165 | 3/1929 | France | 60/313 |
| 139282 | 6/1930 | Switzerland | 60/597 |
| 226648 | 6/1943 | Switzerland | 60/313 |
| 275236 | 8/1951 | Switzerland | 415/205 |
| 375954 | 4/1964 | Switzerland | 60/598 |
| 19453 | of 1907 | United Kingdom | 60/313 |

OTHER PUBLICATIONS

W. W. Peters, Evolution of the General Electric 7FDL Locomotive Diesel Engine, CIMAC 9th Int'l. Congress on Combustion Engines, Stockholm, Sweden, 1971.

*Primary Examiner*—Michael Koczo, Jr.
*Attorney, Agent, or Firm*—Kenyon & Kenyon

[57] ABSTRACT

Method and exhaust manifold for damping the pressure oscillations in an exhaust manifold of an internal combustion engine, consisting in throttling the gas flow in the vicinity of the cylinder outlet and then in accelerating the gases flowing in the manifold by providing a uniform flow section in the manifold substantially smaller than that of the cylinder bore.

26 Claims, 27 Drawing Figures

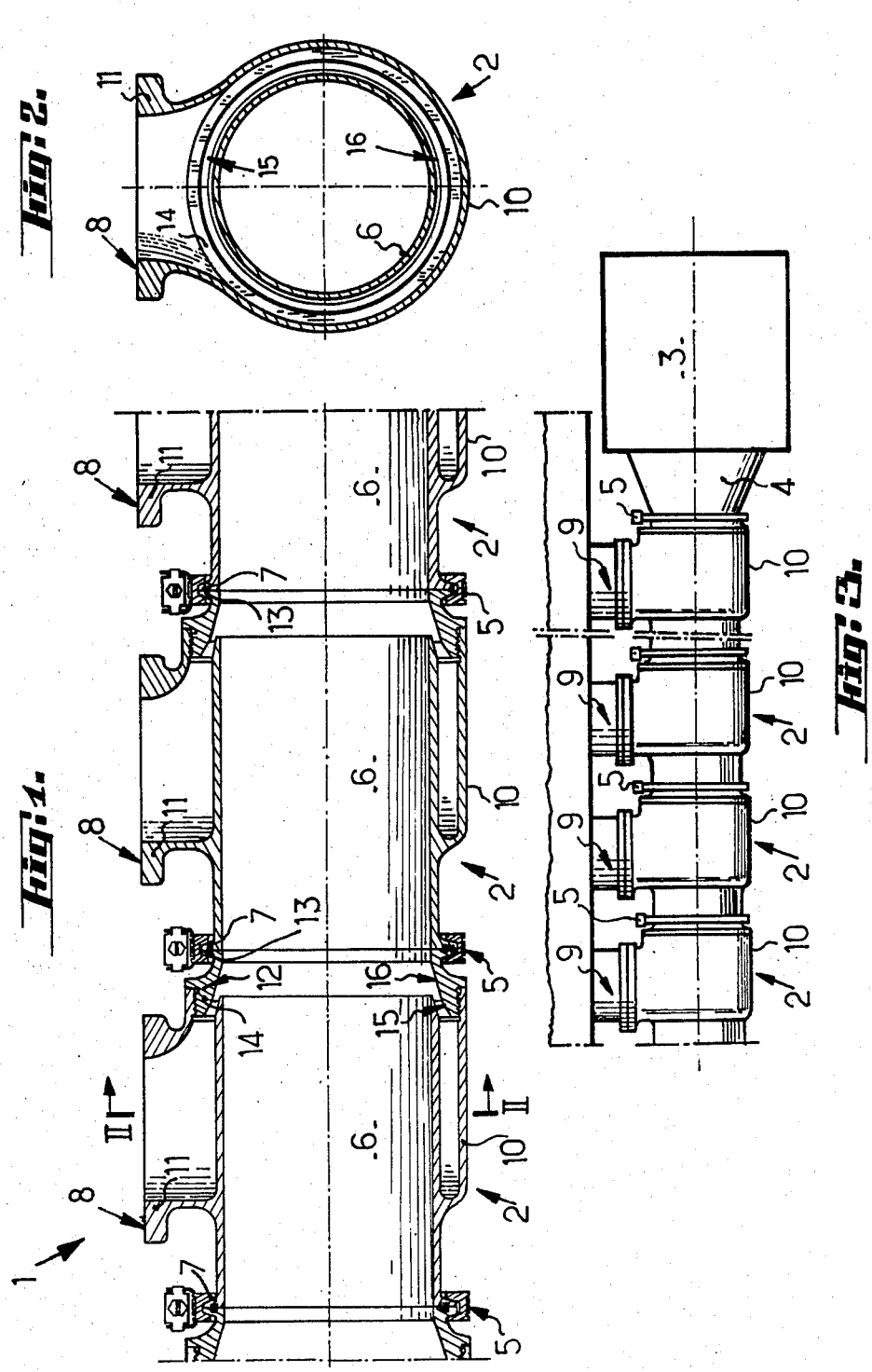

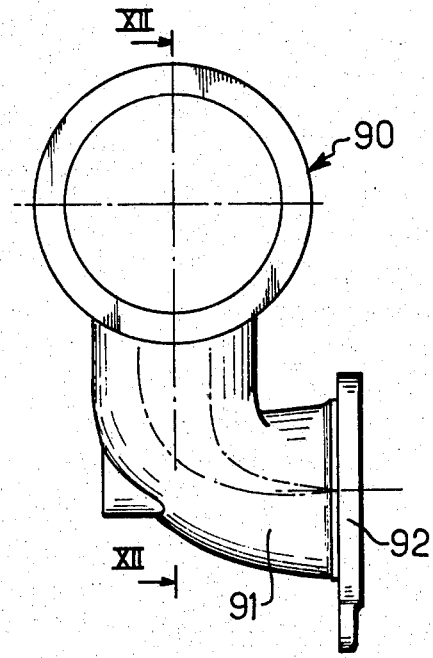
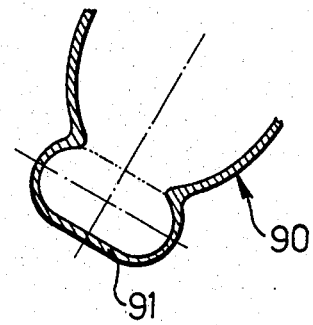
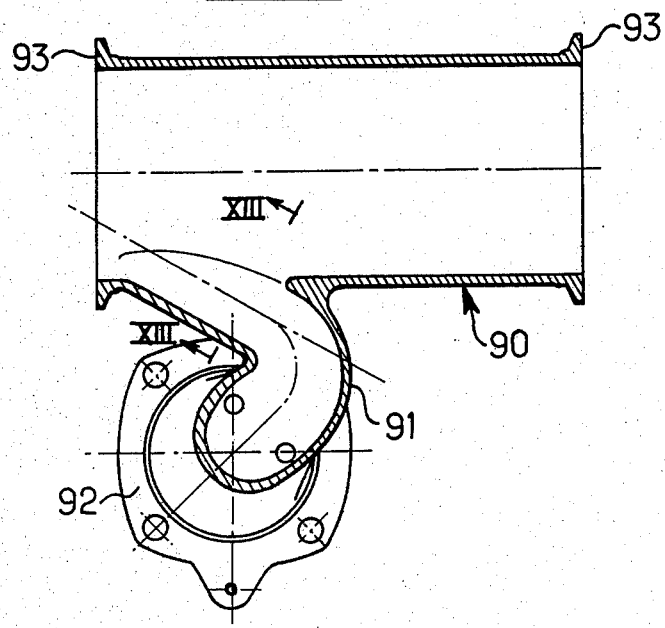

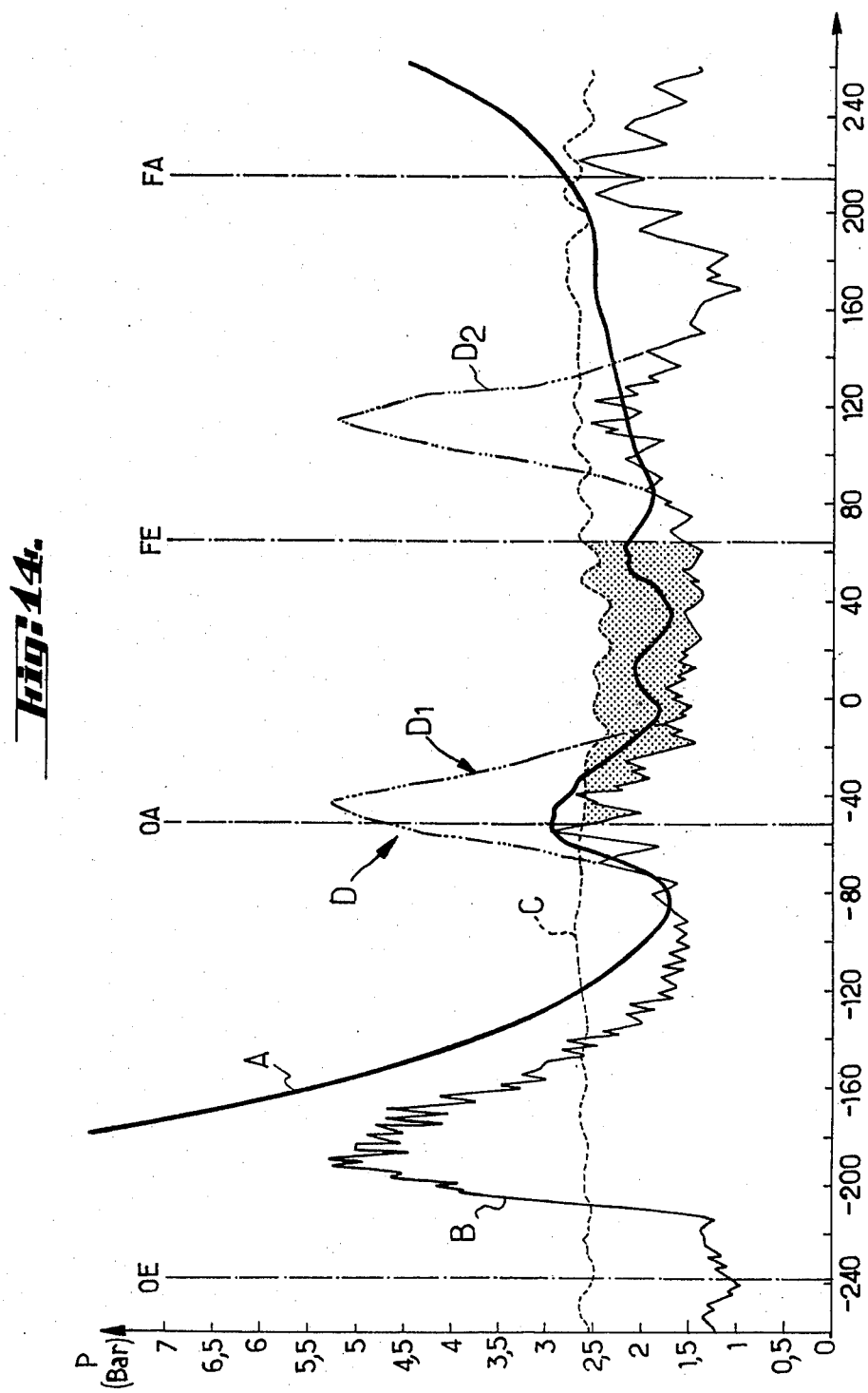

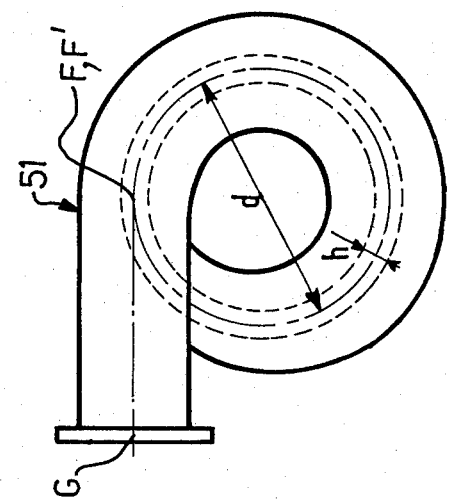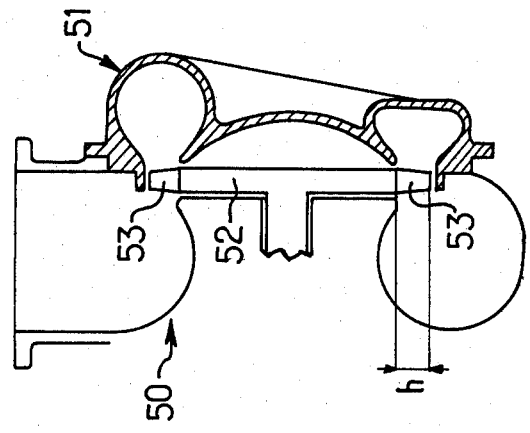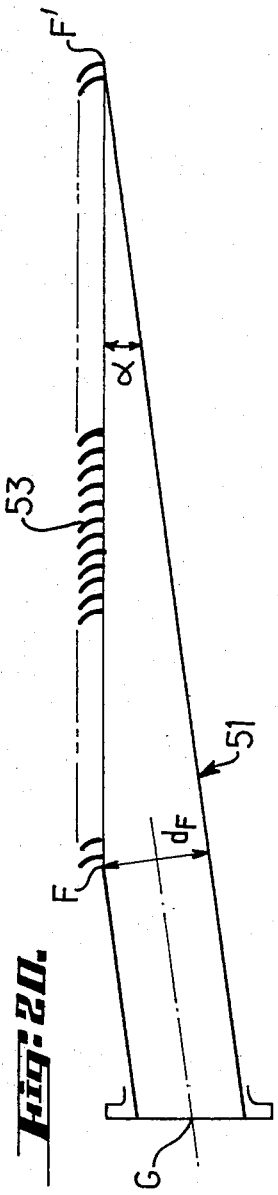

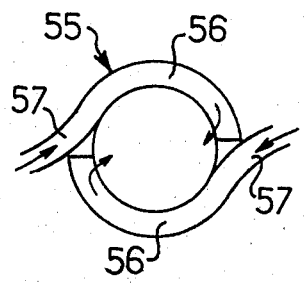
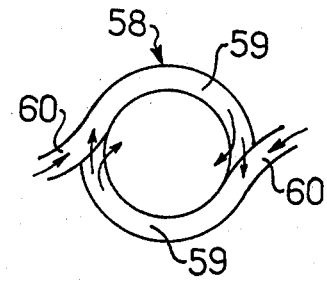
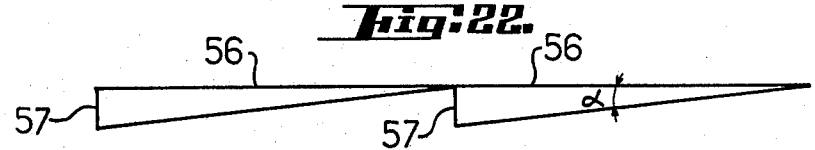
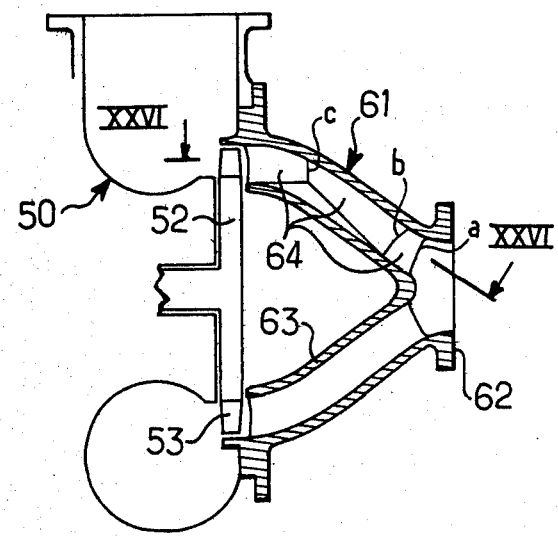
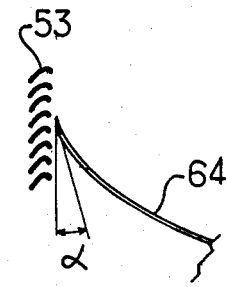

METHOD AND APPARATUS FOR IMPROVING THE GAS FLOW IN AN INTERNAL COMBUSTION ENGINE EXHAUST MANIFOLD

The present invention relates generally to a method and a device for improving the gas flow through an internal combustion engine exhaust manifold and has more particularly for its object a method and a device for damping out the pressure oscillations in an exhaust manifold of several cylinders, and preferably from four to ten cylinders, per bank of cylinders, of an internal combustion engine, e.g. of the supercharged type.

It is important to preliminarily define the various exhaust systems for internal combustion engines with a supercharging stage of the exhaust-gas turbocharger type, namely:

the pressure-wave exhaust systems,
the substantially constant pressure exhaust systems,
the pulse-converter exhaust systems.

In a pressure-wave exhaust system, the engine is equipped with several exhaust manifolds for a single bank of cylinders with several turbine intakes. In this type of supercharging, minimum energy losses during the conveyance of the gases from the cylinders to the turbine are combined with good cylinder scavenging, which is of interest at all loads, but especially at low loads, when it is most necessary. On the other hand, the energy reaches the turbine in the form of puffs, resulting in a turbine efficiency which is all the more limited as its supply with gas is partial.

On the contrary, in an exhaust system of the constant pressure type, the manifold has a single exhaust duct for at least one bank of cylinders, allowing the energy of the exhaust gases to be used in the turbine with optimum efficiency, but at the cost of high energy losses during their conveyance and of a limited scavenging level, a phenomenon that is particularly marked and unfavourable at partial loads.

In an exhaust system of the pulse-converter type, the engine is equipped with several manifolds which open through ejectors into a mixer pipe which itself connects with an intercalated diffuser before the turbine intake. This system allows a good feeding of the turbine to be obtained without excessively prejudicing the scavenging of the cylinders. Such a system is therefore a middle course between the two other aforementioned exhaust systems, but at the cost of energy loss during the conveyance of the exhaust gases. Such a system, however, gives rise to the same wave reflection problems as in the pressure-wave exhaust systems, for the compromise to be found as regards the contraction of the section of each ejector placed at the end of each manifold (on its turbine side) for isolating one manifold from another, results in reflected waves which disturb especially the discharge of the remotest cylinders. Owing to this, at low loads and during acceleration, this system provides no gain over a constant-pressure type manifold. It should be noted, moreover, that the presence of the intercalated diffuser may involve problems as regards the free space available in such an exhaust system for its installation.

An attempt has been made to improve the flow of the gases through a substantially constant pressure exhaust manifold of a supercharged engine by producing an ejector action at the flow junction of each connecting pipe from the heads of the associated cylinders with the single manifold for at least one bank of cylinders. To this end, each said connecting pipe is designed so that the axial velocity of the gases through the manifold and the velocity of the gases through the connecting pipe at their junction are in substantially the same direction, as disclosed more particularly in U.S. Pat. No. 3,380,246.

In this known solution, moreover, in order to minimize flow losses and the separation of the fluid stream in the connecting pipes, the cross-section area of each connecting pipe decreases continually in the direction of the gas flow.

It is to be noted, however, that this continuous decrease of the cross-sectional area of each connecting pipe finally results in a relatively great length of connecting piping.

In addition, in the case of a large-size engine, the use of a single manifold per cylinder bank, while allowing considerable space to be gained compared with a multiple manifold, involves problems about its supporting means, the alignment of its various sections interconnected by expansion bellows and about its axial displacement under the action of thermostresses.

It is the purpose of the present invention to avoid the above drawbacks by providing an exhaust system independent of the number of cylinders, while at the same time combining the advantages of a pressure-wave manifold with those of a conventional, substantially constant pressure manifold.

To this end, the invention provides a method for damping out pressure oscillations in an exhaust manifold for several and preferably from four to ten cylinders per bank of cylinders of an internal combustion engine, e.g. of the supercharged type, wherein an ejector action is exerted on the gases on their entry into the manifold, characterized in that it consists, upon the opening of the exhaust valve and until the piston approaches lower dead centre towards the end of the expansion stroke in keeping the residual potential energy of the cylinder gases as high as possible during their passage through the connecting pipe, thereby reducing the increase in their entropy by throttling the gas flow as close as possible to or in the immediate vicinity of the cylinder outlet, and then in increasing the ejector action, by accelerating the flow of the said gases in the manifold (by converting the pressure energy into a velocity energy imparted to the gases present in the manifold) by providing a uniform flow section in the manifold smaller than that of the cylinder bore, so as to obtain the highest possible flow velocity of the gases, through recovery of the normally lost potential energy of each gas puff, and at the same time increasing the expansion work furnished to the piston and reducing the delivery or discharge work furnished by the piston.

The invention also provides an exhaust manifold for carrying out the said method, characterized in that each connecting pipe is shaped as a nozzle, the ratio of the outlet cross-sectional area (on its manifold side) to the inlet cross-sectional area (on its cylinder side) of which is between 0.3 and 0.8 and preferably between 0.4 and 0.5.

According to another characterizing feature of the exhaust manifold according to the invention, the ratio of the inner diameter of the manifold to the cylinder bore is between 0.30 and 0.75.

According to another characterizing feature of the invention, each said connecting pipe has, at its flow junction with the manifold, a flow section which is either annular, or partially annular, or full.

According to another characterizing feature of the invention, each connecting pipe is reduced in length so that each manifold portion, in the case of a manifold of great length, associated with a cylinder is rigidly supported directly by the head associated with the said cylinder.

According to another characterizing feature of the invention, the last manifold portion before the turbine intake is connected to a diffuser, this being facilitated by the different diameters of the manifold and the turbine inlet owing to the small diameter of the manifold.

According to an advantage of the invention, the initial back pressure in each connecting pipe is increased during the period between the opening of the exhaust valve and the lower dead centre position of the piston of a cylinder, thus contributing to considerably reduce the unavoidable lamination losses between each cylinder and each connecting pipe at the passage through the exhaust valve.

According to another advantage of the invention, the temperature of the exhaust gases between the cylinder outlet and the turbine intake is reduced by 30° to 40° compared with a conventional manifold.

According to another advantage of the invention, the temperature of the exhaust valves is reduced by about 50° to 60° compared with a conventional manifold.

According to another advantage of the invention, improved discharge is obtained, the said improved discharge being moreover identical for all the cylinders, and allowing the specific consumption of the engine to be reduced by about 2 to 3% where a diffuser is not used and by 5 to 6% where a diffuser is used.

According to another advantage of the invention, the use of a diffuser with a conventional turbine allows the mean static pressure in the manifold to be reduced by about 10%, thus additionally improving cylinder discharge.

According to another characterizing feature of the invention, improved cylinder scavenging is obtained at reduced loads, thus ensuring a load taking aptitude comparable with that of a pulse-converter manifold and superior to that of a substantially constant pressure manifold, together with reduced fouling risks.

According to another advantage of the invention, such an exhaust manifold allows the turboblower to be used at high speeds.

According to another advantage of the invention, the use of nozzles with considerable section contraction allows the length of the connecting piping to be reduced and therefore the ejector action exerted on the gases at their junction with the manifold to be improved.

According to another advantage of the invention, the use of nozzles with considerable section contraction allows the pressure oscillations induced in the manifold after the transfer of the kinetic energy of the gases issuing from each nozzle to the gases located in the manifold to be attenuated.

According to another advantage of the invention, it allows the exhaust opening to be optimized owing to the fact that all the cylinders have the same discharge.

According to another advantage of the invention, in the case of a manifold of great length constituted by successive portions assembled together, the manifold portions, each associated with a connecting pipe, are preferably substantially identical, thus facilitating the use of such an exhaust manifold. Moreover, the reduced dimensions of the connecting pipes and of the manifold allow considerable space gain and cost reduction to be achieved.

Figure 5:
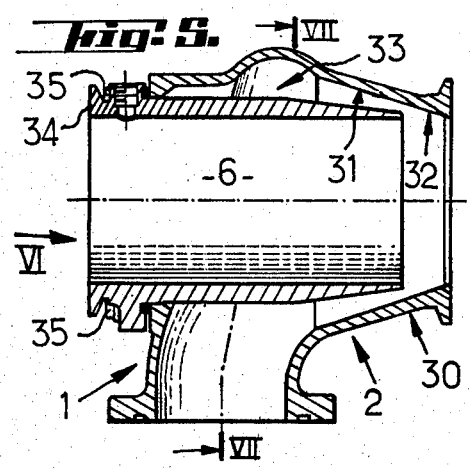
Figure 6:
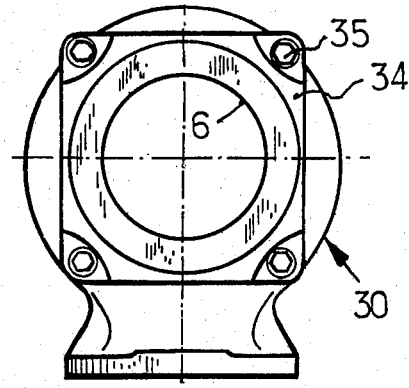
Figure 7:
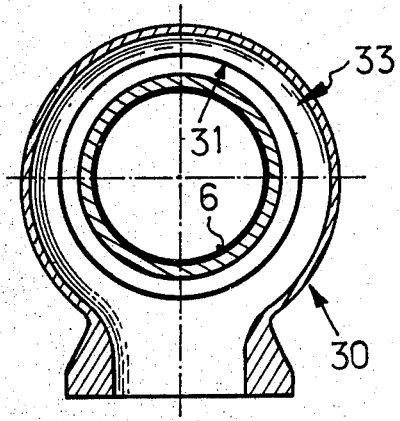
Figure 8:
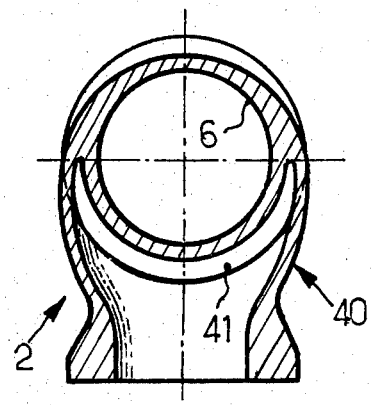
Figure 9:
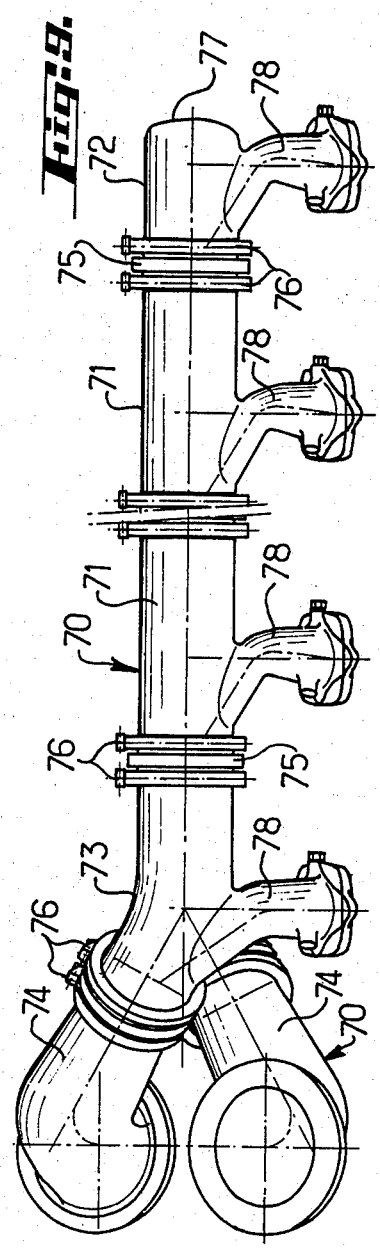
Figure 10:
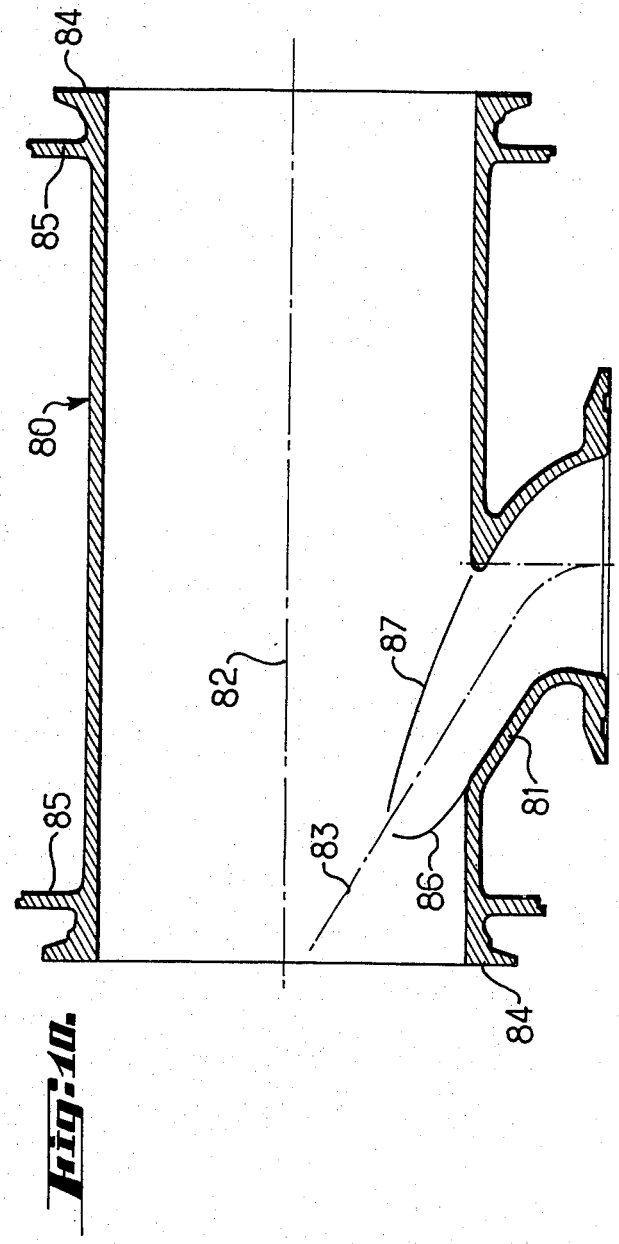
Figure 15:
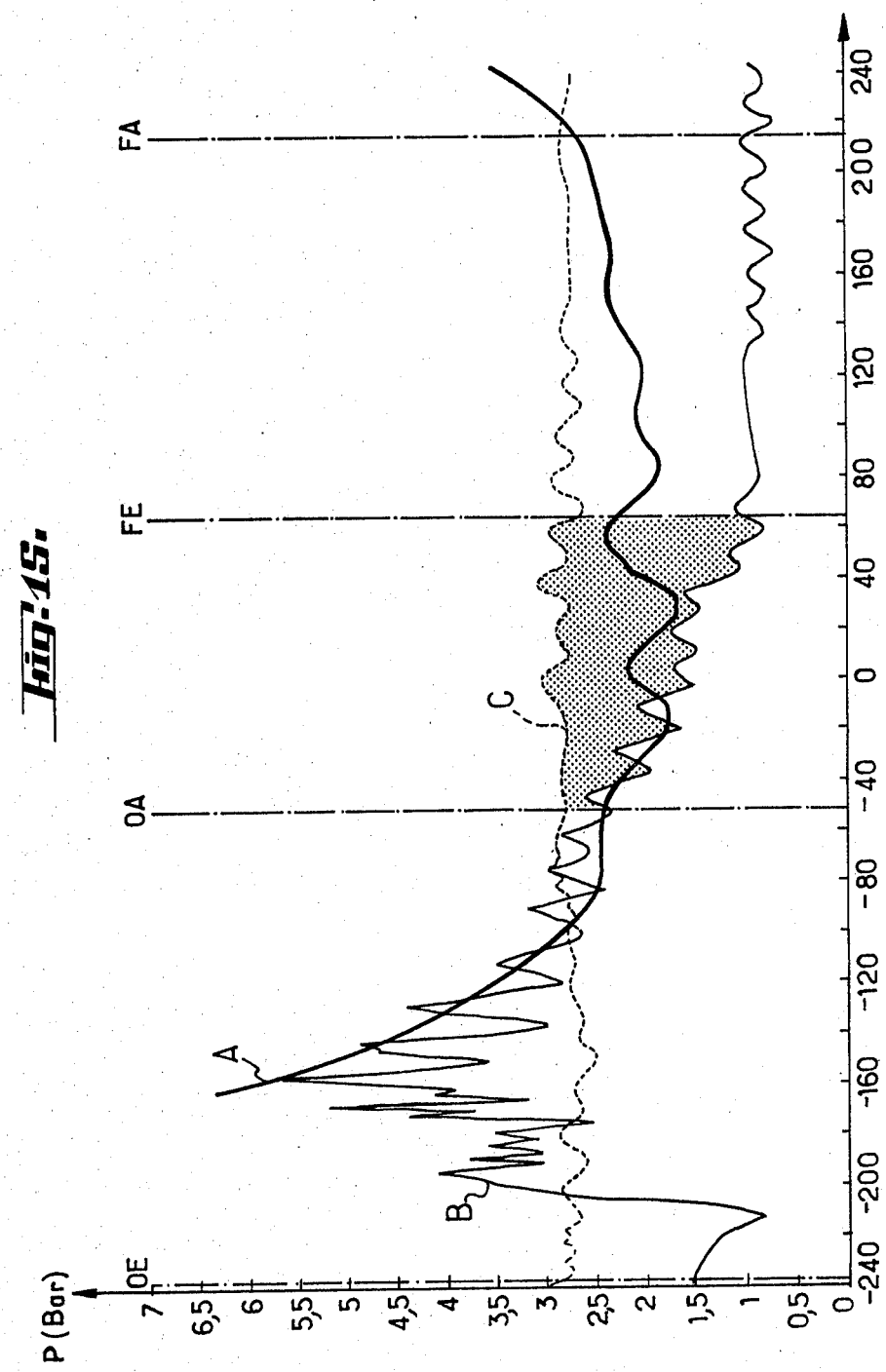
Figure 16:
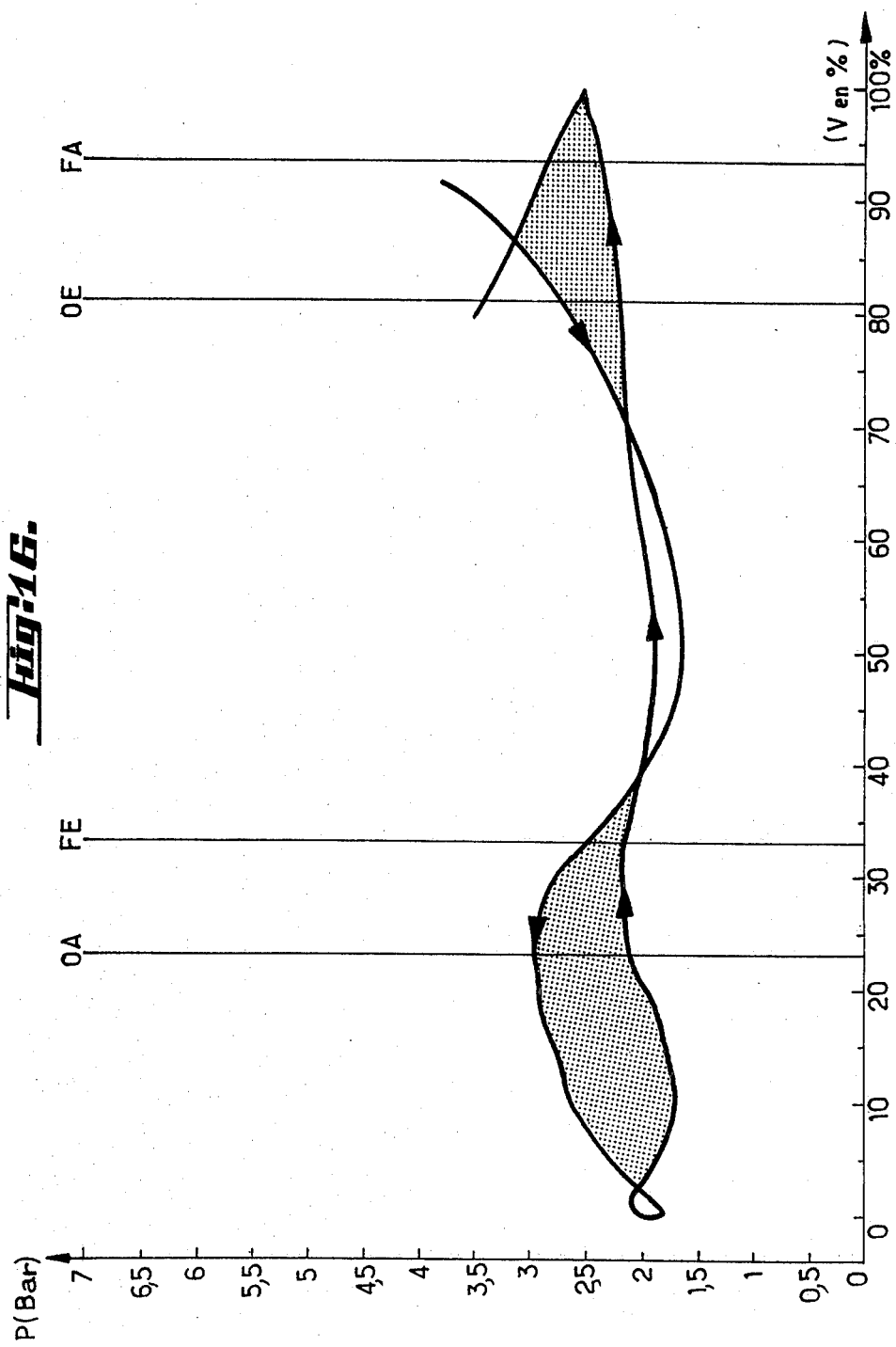
Figure 17:
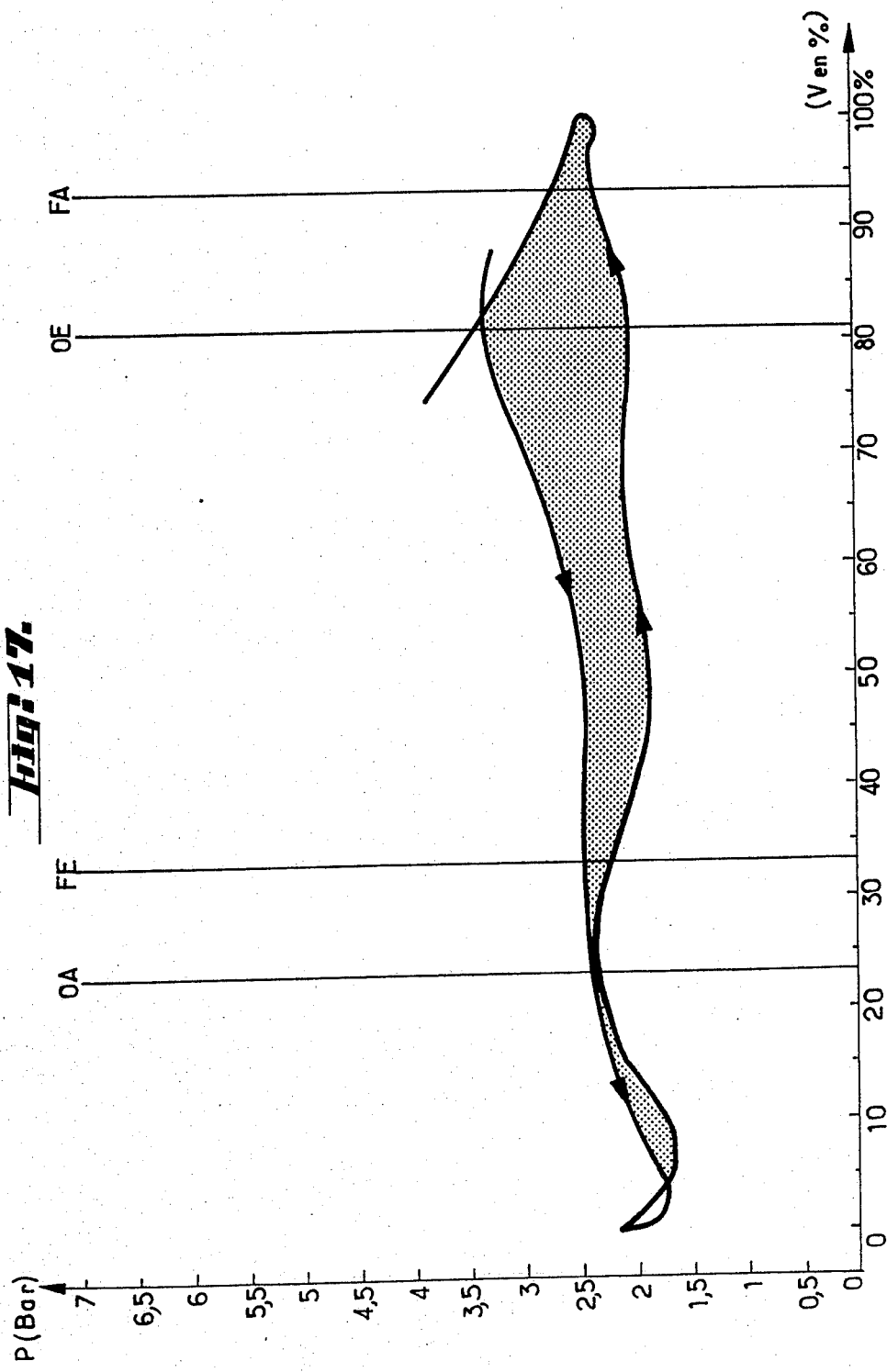

Other advantages, characterizing features and details of the invention will appear more clearly from the following explanatory description made with reference to the appended drawings given solely by way of example wherein:

FIG. 1 is a longitudinal sectional view of part of a manifold according to the invention, with a first form of embodiment of the connecting pipes, FIG. 2 is a sectional view upon II—II of FIG. 1, FIG. 3 is a partial elevational view of a manifold according to the invention for a supercharged internal combustion engine, FIG. 4 is a partial elevational view of a manifold portion with connecting nozzles according to a second form of embodiment, FIG. 5 is a longitudinal sectional view of a manifold portion with a connecting pipe according to a third form of embodiment, FIG. 6 is an end view in the direction of arrow VI of FIG. 5, showing how each connecting pipe connects with the manifold, FIG. 7 is a sectional view upon VII—VII of FIG. 5, FIG. 8 is an end view of a manifold portion with a connecting pipe according to a fourth form of embodiment of the invention, FIG. 9 is a diagrammatic view of an exhaust manifold arrangement according to a simplified form of embodiment, FIG. 10 is a diagrammatic cross-sectional view of another improved form of embodiment of an exhaust manifold portion, FIG. 11 is a front view of another form of embodiment of an exhaust manifold portion, FIG. 12 is a cross-sectional view of the same manifold portion upon XII—XII of FIG. 11, FIG. 13 is a partial sectional view of the same manifold portion upon XIII—XIII of FIG. 12, FIG. 14 is a graphic representation of different curves illustrating the characteristics of the pressure in a cylinder, of the pressure in its connecting pipe, and of the supercharging pressure for a manifold according to the invention not equipped with a diffuser, depending on the position of the piston in the cylinder indicated by the angles of rotation of the crankshaft, FIG. 15 represents the same curves as FIG. 14, but for a pressure-wave exhaust manifold, FIG. 16 graphically illustrates the low-pressure cycle of an internal combustion engine equipped with an exhaust manifold according to the invention, with the characteristics of the curves of FIG. 14, FIG. 17 graphically represents the low-pressure cycle of an internal combustion engine provided with a pressure-wave exhaust manifold having the characteristics represented in FIG. 15, FIG. 18 is a diagrammatic front view of a first form of embodiment of a volute connecting the outlet of the exhaust manifold to the supercharger turbine, FIG. 19 is a diagrammatic cross-sectional view of the same volute mounted on the said turbine, FIG. 20 is a developed view of the volute represented in FIGS. 18 and 19;

FIG. 21 is a diagrammatic view of another form of embodiment of the same connecting volute, constituted by two conjoined half-volutes isolated from one another, FIG. 22, is a developed diagrammatic view of the volute of FIG. 21, FIG. 23 diagrammatically illustrates/another form of embodiment of the connecting volute, constituted by two conjoined half-volutes communicating with one another, FIG. 24 is a developed diagrammatic view of the volute of FIG. 23, FIG. 25 is a diagrammatic cross-sectional view of another form of embodiment of the connection of the manifold outlet with the turbine, and FIG. 26 is a diagrammatic sectional view upon XXVI—XXVI of FIG. 25.

Figure 27:
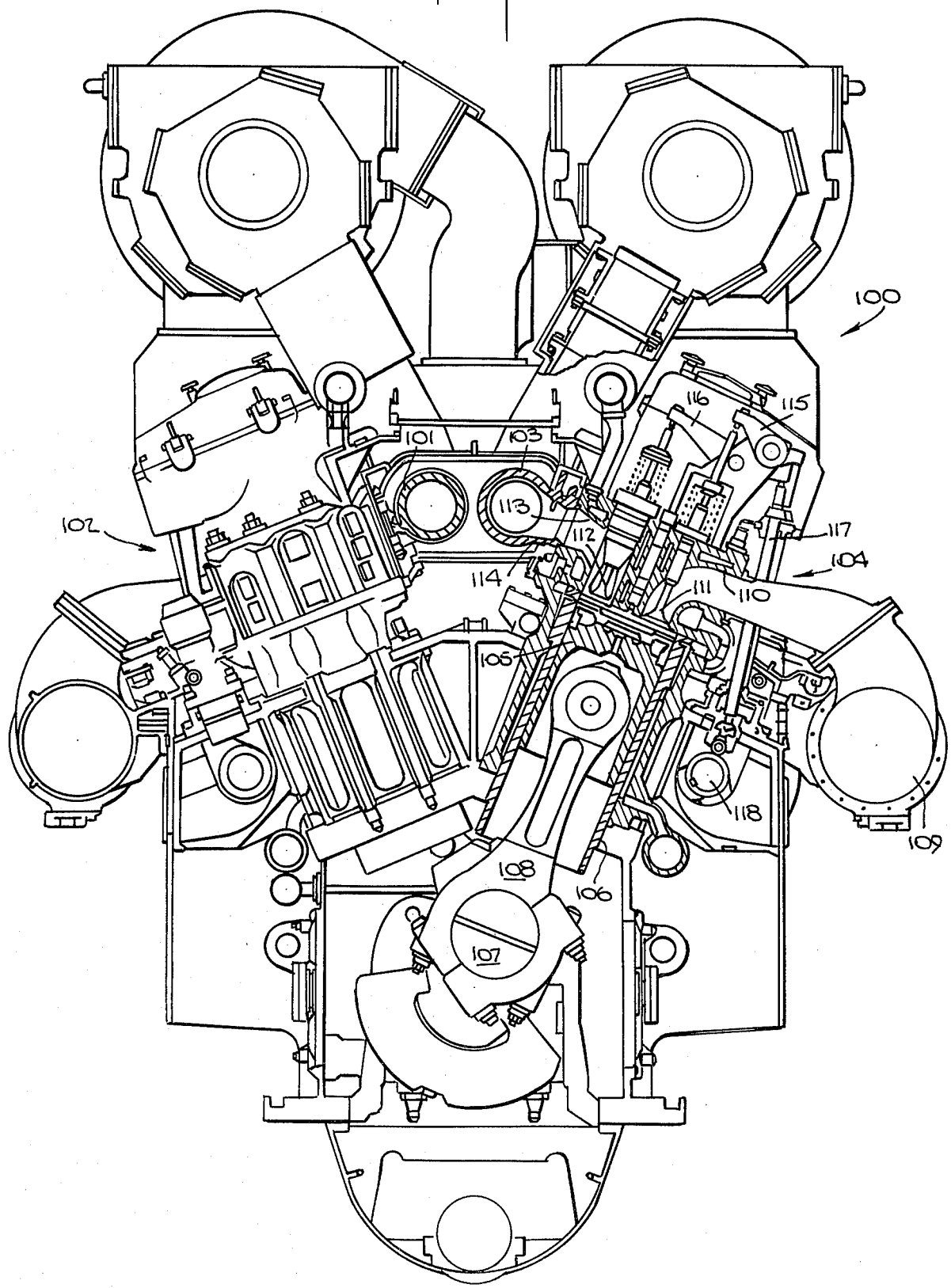

FIG. 27 is an end view, partly in section, of a V-type turbocharged internal combustion engine equipped with a single manifold for each cylinder bank according to the invention.

According to the invention, there is considered an internal combustion engine equipped with a single manifold for at least one cylinder bank, with supercharging of the exhaust-gas turbocharger type.

Referring to FIGS. 1 to 3, the exhaust manifold 1, according to a first form of embodiment, comprises for example several intermediate portions or sections 2 identical with one another except for the first portion (not shown) at the opposite end from the turboblower 3, and which is provided with a closing cover. Between the last manifold portion 2 and the turboblower 3 is provided a connection 4 which may advantageously consist of a diffuser and can be mounted without difficulty owing to the gain of space offered by an exhaust manifold according to the invention. The various manifold portions 2, one per cylinder, are axially aligned and interconnected by twos by means of junction boxes 5 or conventional expansion bellows.

Each manifold portion 2 comprises a main duct 6 provided at one end with a flange 7 (for example on its upstream end).

Each manifold portion 2 includes a T-shaped pipe 8 for connection to the head 9 of the associated cylinder. Each connecting pipe 8 comprises a cylindrical element 10 mounted concentrically with and spaced externally from the main duct 6 element 10 has one end nearest (the flange 7 of the main duct 6) connected to the duct 6, whereas its other end is free and extends slightly beyond downstream end of the duct. Into the cylindrical element 10 opens, in perpendicular relationship to its axis, another cylindrical, very short element 11 which is itself connected to the head 9 of the associated cylinder in a manner known per se.

To interconnect two adjacent manifold portions 2, there is an annular ejector member 12, one end of which is provided with a flange 13 mating with the flange 7 of adjacent manifold portion 2 through the medium of a junction box 5. The member 12 is provided towards its other end with a cylindrical portion 14 the peripherical surface of which is threaded and which is screwed into the free end of the cylinder 10.

When the ejector member 12 is positioned, the free end of the main duct 6 is partially inserted in the member 12 without contacting in the same. An annular flow section 15 is thus defined in the direction of flow of the gases, followed bby a full flow section in the region of the member 12.

Depending on the needs, the member 12 may have a different internal profile, i.e. the annular flow section 15 through which the exhaust gases will flow can be increased or reduced. Moreover, its internal profile also allows the angle of incidence of the flow of exhaust gases with respect to the axis of the manifold to be varied, the said angle being preferably in the neighbourhood of 0°.

Referring to FIG. 4, there is shown a portion or section 2 of a manifold 1 according to a second form of embodiment. Into a single manifold portion 2 open, for example two connecting pipes 20 in the form of curved nozzles with a contraction of their section and quite reduced in length. In this form of embodiment, each connecting pipe is secured by welding to the manifold and opens more or less at one end into the portion of main conduit 6. Of course, the curvature of each nozzle is such that the angle of incidence between the manifold gases and the gases proceeding from each connecting pipe is reduced. It should be noted that, in this case, there is a total annular flow section for the gases at the junction of each connecting pipe with the manifold.

Referring to FIGS. 5 to 7, there is shown an exhaust manifold portion or section 2 with a connecting pipe 30 according to a third form of embodiment. The connecting pipe 30, which also is shaped as a nozzle, approximates that of the first form of embodiment (FIG. 1), but in this case the ejector member 12 is directly integral with or incorporated in the connecting pipe. In the direction of flow of the gases, there is defined about the portion of manifold main duct 6 an annular flow section 33, contracted on its side opposite to the inlet of the nozzle, a progressively decreasing annular flow section 31 and lastly a full flow section 32 at the junction of the pipe with the manifold. Each connecting pipe 33 and the main manifold duct 6 are assembled together not by welding but by screwing through the medium of a support 34 and screws 35.

Referring to FIG. 8, there is diagrammatically shown an end view of a manifold portion 2 with the connecting pipe 40 according to a fourth form of embodiment, which differs from the other forms of embodiment mainly by the fact that the flow section 41 between each connecting pipe and the manifold is only partially annular.

Therefore, in each of the above forms of embodiment, each connecting pipe (8, 20, 30, 40) is shaped as a nozzle whose section contraction defined by the ratio of the cross-sectional area on the manifold side to the cross-sectional area on the cylinder side is between 0.3 and 0.8 and preferably between 0.4 and 0.5.

With an exhaust manifold according to the invention, the inner diameter of the manifold can be reduced considerably compared with a conventional, substantially constant pressure manifold, and it is so selected that the ratio of its diameter to the cylinder bore is between 0.30 and 0.75.

Also to be noted is the fact that in all the above forms of embodiment the length of the connecting pipes is small, thus avoiding the need for expansion bellows and therefore allowing the connecting pipe connected to the engine cylinder head to directly support the associated manifold portion. This is additionally facilitated by the fact that the inner diameter of the manifold is considerably reduced.

There will now be described, with reference to FIGS. 9 to 13, various simplified and improved forms of embodiment of such an exhaust manifold.

FIG. 9 shows both exhaust manifolds 70 each associated to one of the two banks of the cylinders in V-arrangement of an internal combustion engine comprising at least four cylinders per bank. Each exhaust manifold 70 compresses a certain number of independant portions or sections 71, 72, 73 and 74 aligned end to end and interconnected through the medium of connecting members 75, which may be either junction boxes or expansion bellows, each end of each manifold portion being connected to the corresponding end of the connecting member 75 by means of clamps 76.

The first portion 72 forming the closed end of the manifold 70 is closed at its end 77 and connected at its opposite end to the following portion 71 through the medium of a said connecting member 75. The penultimate portion 73 of the manifold 70 is bent so as to allow the intercrossing of the exhaust manifolds 70 as appears in FIG. 9, and the last portion 74 constituting the outlet of the exhaust manifold is intended to be connected to the intake of a supercharger turbine.

Each manifold portion 71, 72 and 73 is cast integral with a pipe 78 for connecting to the ccorresponding cylinder.

It will be noted that the various portions or sections of the exhaust manifold 70 display all the characterizing features of the invention. In particular, each connecting pipe 78 is in the form of a nozzle whose outlet (manifold side) and inlet (cylinder side) cross-sectional areas are in a ratio comprised between 0.3 and 0.8 and preferably between 0.4 and 0.5. The ratio of the inner diameter of the exhaust manifold 70 to the cylinder bore is between 0.30 and 0.75. It will also be noted that the flow section for the exhaust gases within a manifold 70 is constant and uniform along the entire length of the manifold.

Advantageously, in the exhaust manifolds 70 as well as in the other two forms of embodiment described with reference to FIGS. 10 to 13, the angle formed between the longitudinal axis of a manifold portion and the axis of the connecting pipe at its entry into the manifold is of the order of 30°.

Two particular forms of embodiment of exhaust manifold portions or sections are described in more detail with reference to FIGS 10 to 13.

The manifold portion or section 80 shown in FIG. 10 is intended for an engine in V-arrangement and is substantially cylindrical with a circular cross-section, and is integral with a substantially straight connecting pipe 81 of small length. As mentioned above, the angle formed between the longitudinal axis 82 of the manifold portion 80 and the longitudinal axis 83 of the pipe 81 at its entry into the manifold is about 30°. Each end of the manifold portion 80 is provided with a first, outer circular flange 84 for its connection by screwing by means of a clamp to the adjacent manifold portion, and with a second, inner circular flange 85. The lines 86 and 87 diagrammatically indicate the intersection between the end of the pipe 81 and the cylindrical manifold portion 80.

FIGS. 11 to 13 diagrammatically illustrate another form of embodiment of such a manifold portion or section, intended for an in-line engine. The manifold portion 90 is substantially cylindrical with a circular cross-section and is formed integrally with the pipe 91 for connection to the corresponding cylinder, ending with a flange 92 for securing it to the cylinder head. As seen in FIGS. 11 and 12, the connecting pipe 91 is not substantially rectilinear as in the case of FIG. 10, but is on the contrary incurved in a compound manner. FIG. 13 shows the cross-sectional shape of the end of this connecting pipe at its entry into the manifold portion 90. As previously, the portion 90 is provided at each end with a circular flange 93 allowing for its connection to the adjacent manifold portion or to an intermediate connecting member by means of a clamp.

In FIG. 14 are shown various pressure curves, limited to the low pressures, depending on the angles of rotation of the crankshaft, the upper dead centre of the piston corresponding to an angle of 0°. On the graph are shown the instants relating to the opening of the exhaust valve (OE), the opening of the admission valve (OA), the closing of the exhaust valve (FE) and the closing of the admission valve (FA).

Shown in strong continuous lines is the pressure measured in the cylinder (curve A), in less-strong continuous lines the exhaust pressure measured in the connecting pipes at the outlet of the cylinders (curve B), in dotted lines the supercharging pressure measured in the intake manifold (curve C) and in dots and dash lines the exhaust pressure without ejector action at the connecting pipes (curve D).

In examining the curves of FIG. 14 (without the use of a diffuser) it is seen that after the opening of the exhaust valve ($-240°$), the exhaust stage of the cycle begins and a pressure wave or puff (curve B) appears in the connecting piping of the cylinder considered. The amplitude of this pressure wave increases relatively rapidly (rather steep ascending front) and reaches a maximum in the vicinity of the lower dead centre ($-180°$) of the piston. From that instant, the wave decreases with a less steep descending front than its ascending front, and is then followed in its decrease by the pressure (curve A) existing in the cylinder. This decrease is sufficiently rapid to ensure satisfactory cylinder discharge.

Thereafter, the pressure wave (curve B) slightly oscillates, corresponding to the puffs subsisting in the manifold and proceeding from the other cylinders. As for the pressure in the cylinder (curve A), it begins to increase progressively from the lower dead centre of the piston ($+180°$) to the high-pressure stage of the cycle (not shown).

To be noted is the fact that between the opening of the admission valve and the closing of the exhaust valve, the pressure in the connecting pipe (curve B) has a sufficiently lower value than the supercharging pressure (curve C) to allow for correct scavenging of the cylinder (dotted line in FIG. 14).

Thus, between the opening of the exhaust valve and down to the lower dead center of the cylinder piston, maximum preservation of the potential energy of the cylinder gases is ensured during their passage through the connecting pipe, owing to the considerable section contraction of said pipe. This, in fact, is tantamount to increasing the initial back-pressure or counter-pressure in the connecting pipe, which is highly favourable to the reduction, on the one hand, of the lamination losses during the passage through the exhaust valve, and on the other hand, of the temperature of the valve. The conversion of some kinetic energy into heat is thus avoided.

It is important to note that the preservation of pressure energy during the passage from the cylinder to the connecting pipe between the opening of the exhaust valve and the lower dead centre of the piston takes place at a favourable moment of the cycle and allows the discharge of the cylinder during the following stage to be improved.

Thereafter, owing to the ejector action exerted by the connecting nozzle, the transfer of the gases from the connecting pipe into the manifold is accelerated by converting the pressure energy into a velocity energy, which energy is derived from the puff itself instead of being produced by the work of the piston.

By having a reduced uniform section of flow in the manifold, a high flow velocity of the gases is maintained. This velocity energy may be thereafter reconverted into pressure energy by a diffuser advantageously placed at the intake of a conventional turboblower, which also ensures a reduction of the static pressure in the manifold and therefore an additional improvement of the discharge of the cylinders which is substantially the same for all the cylinders.

Referring again to FIG. 14, if the ejection effect produced by the connecting pipes were eliminated, there would obtain in the manifold an oscillating curve (such as curve D) with strong puffs D1, D2 . . . proceeding from the various cylinders, which would be absolutely detrimental to the performance of the engine.

Referring to FIG. 15, there are shown the same types of curves as in FIG. 14, but for a pressure-wave exhaust manifold. It is observed that, in this type of manifold, satisfactory scavenging of the cylinders is obtained (dotted region) since between the opening of the admission valve and the closing of the exhaust valve the supercharging pressure (curve C) is markedly higher than the pressure in the connecting pipe (curve B).

It may be observed, however, that the pressure wave (curve B) in FIG. 14 for an exhaust manifold according to the invention is shorter in duration than the pressure wave shown in FIG. 15, i.e. cylinder discharge is more rapid and more complete in the arrangement according to the invention.

Referring to FIGS. 16 and 17, there is shown the low-pressure stage of the engine cycle corresponding to FIGS. 14 and 15, respectively, the pressure in the cylinder being shown as a function of the volume of the said cylinder in percentage.

In comparing the curves 16 and 17, it is seen that the negative work performed by each piston is less in the case of the manifold according to the invention (FIG. 16) than in the case of the pressure-wave manifold (FIG. 17). The negative work of each piston is substantially represented by the dotted areas of both Figures.

Thus, a manifold according to the invention offers many advantages over the known manifolds, by not only increasing the ejector action by throttling the gas flow, but above all by placing this ejection effect as close as possible to the cylinder outlet, whereas in a manifold of, for example, the pulse-converter type, the ejection effect is located towards the turboblower end of the manifold.

The presence of the substantially constant pressure at the outlet of the manifold may allow such a manifold to be used in various systems, such as the one known as "comprex" which requires an almost constant feeding, which systems are substituted for turboblowers.

In the case of an engine with double supercharging, a manifold according to the invention can be advantageously used as a high-pressure turbine stage.

The manifold according to the invention can be used in conjunction with non-supercharged engines to ensure better cylinder discharge and higher engine power.

The manifolds just described offer in particular the advantages of being considerably smaller in diameter than the manifolds generally used, resulting in space saving, of freely providing gas velocity energy capable of being converted at the outlet of the manifold into pressure energy, and of having a section substantially equal to the efficient section of the intake nozzle of the supercharger turbine.

The turboblowers of supercharged engines are designed and constructed to be connected, on their gas intake side, to the manifolds known in the prior art, which are greater in inlet diameter than the manifold according to the invention. To connect this manifold to such a turbine, use must therefore be normally made of a diffuser whose included angle or angle of taper or divergence, in order to ensure an efficient conversion into pressure of the kinetic energy of the gases at its inlet, should be between 10° and 15°, thus leading to a length of the order of 500 millimeters. The space necessary for mounting such a diffuser would be greater than that generally available, all the more so as the turbine intake is often placed laterally. The mounting of a diffuser is therefore generally difficult or impossible.

Moreover, the efficiency of such a diffuser is very low. The gas velocity at the outlet of the manifold decreases only very little with engine load and speed, contrary to the usable expansion ratio of the gases, so that the kinetic energy component may reach an important proportion of the pressure component at partial loads. This kinetic energy component is largely destroyed and is converted into heat between the end of the manifold and the point located before the turbine distributor. Indeed, the velocity of the gases at that point is about from 3 to 4 times lower than at the outlet of the manifold, and no intermediate recovery of energy takes place since the diffuser and the configuration of the gas intake casing of the turbine only quite imperfectly allow for the conversion of velocity into pressure energy. Owing to the partial thermal degradation of the energy available at the outlet of the manifold during passage through the diffuser and the gas intake casing of the turbine, it is no long possible, thermodynamically, to obtain, by accelerating the gases in the distributor, at its outlet, over an efficient flow section equal to that of the manifold outlet, the speed which existed initially at the outlet of the manifold. It is therefore desirable to do away with the unefficient diffuser, gas intake casing and distributor assembly, so as to be able to use without intermediate conversion the initial gas velocity component at the outlet of the manifold.

The invention therefore provides a connection ensuring the arrival into the turbine of gases whose velocity is preserved at a maximum level, resulting an maximum energy, at the same time maintaining an available energy depending little on engine load.

To this end, the invention provides for the gases issuing from the manifold a flow section which remains constant or diminishes progressively down to the turbine rotor in order to create the required rotor attack conditions, i.e. contrary to what a diffuser already described as unfavourable does.

There is thus preserved in the total available energy of the gases issuing from the manifold, the gas velocity or kinetic energy component which was available at the outlet of the manifold and which is practically independent of the engine load and speed.

According to another characterizing feature of the invention, this method consists in reducing in a substantially linear manner the flow section between the manifold and the turbine.

The invention also provides a device for carrying out this method, comprising an exhaust manifold of the abovedescribed type, connected to the turbine of an internal combustion engine supercharging system, in which the outlet of the exhaust manifold is connected directly to the turbine through a conduit, volute or the like, the gas flow section of which is constant or diminishes progressively from the manifold outlet to the turbine rotor.

There will now be described, with reference to FIGS. 18 to 20, a first form of embodiment of a volute for connecting the outlet of an exhaust manifold according to the invention to the intake of an axial-flow turbine for supercharging an internal combustion engine.

In this first form of embodiment, the connection between the outlet of the exhaust manifold and the axial-flow turbine 50 uses a nozzle-less volute-shaped intake casing 51 for the turbine gases, which is mounted on the turbine frame so as to cover the turbine rotor 52 carrying radial blades 53 of a height h. The volute 51 is so shaped that the exhaust gas flow section diminishes progressively in such a manner that the velocity with which the turbine rotor 52 is attacked by the exhaust gases is constant along the entire periphery of said rotor, the value of said gas flow section being maximum at the inlet F of the volute and zero at the outlet F', and decreasing in a substantially linear manner along the circumference of mean diameter d.

In case the outlet section of the exhaust manifold is such that the velocity required by the turbine is not reached, the inlet section at F is slightly reduced (the said inlet section at F being smaller than or equal to the section at G, which is the outlet section of the exhaust manifold), the gas-flow section through the volute again diminishing progressively in a substantially linear manner to the section at F' at the turbine inlet.

In conventional connections between an exhaust manifold and an axial-flow turbine, the angle at which the gases approach the turbine rotor and with which a maximum efficiency is ensured is obtained by the value of the inclination of the blading at the exit from the turbine distributor. According to such characterizing feature of the invention, wherein the connection does not comprise any distributor, the optimum angle of attack of the rotor 52 by the exhaust gases is obtained by the angle $\alpha$ which the external gas-pressure face of the volute forms with a plane parallel with the plane of the turbine rotor 52.

To ensure adaptability to several gas flow rates, it is necessary to proceed in a different manner from the one adopted in the prior art for such conventional axial-flow turbines and consisting in changing the efficient section and/or the incidence of the distributor, the profile of the rotor being adapted to the velocity triangle prevailing from the root to the tip of the rotor blade. According to the present invention, such adaptability is achieved by modifying the diameter $d_f$ at the entrance into the volute 51 and/or by varying the height h of the blades 53 of the turbine rotor 52.

In the case of an internal combustion engine with two banks of cylinders in V-arrangement, the outlets of both exhaust manifolds, each associated with a bank of cylinders, may advantageously be connected to the turbine through a double-inlet volute such as the one illustrated in FIGS. 21 and 22, or 23 and 24, each of the said volute inlets receiving the exhaust gases from one manifold associated with one bank of cylinders. Depending on the cylinder firing order and number, use can be made of either two conjoined half-volutes isolated from one another and each feeding a half-sector of the turbine rotor (in the case of two independent banks of cylinders where the engine comprises a sufficient number of cylinders, e.g. at least four cylinders per bank with firings regularly following one another) or two conjoined half-volutes in communication with one another (e.g. where the firings of the cylinders in the banks do not regularly follow one another).

In FIG. 21, there is diagrammatically shown such a connecting volute 55, made up of two half-volutes 56 conjoined in the form of a circle and each having an inlet 57 diametrically opposed to the inlet of the other half-volute, and connected to an exhaust manifold associated with the cylinders of one of the two banks in V-arrangement.

The arrows of FIG. 21 show the path followed by the exhaust gases in each half-volute, said gases flowing through the half-volute 56 from its inlet 57 to its diametrically opposite end. FIG. 22 is a diagrammatic developed representation of the half-volutes 56, where they are clearly seen to be isolated from one another.

In FIG. 23, the connecting volute 58 between the outlet of the exhaust manifold and the axial-flow turbine is constituted by two half-volutes 59 conjoined in the form of a circle, in communication with one another, and each having an inlet 60 associated with the exhaust manifold of one of the cylinder banks. As seen in the developed view of FIG. 24, each half-volute 59 is connected to the other half-volute 59 at its end diametrically opposite to its inlet 60.

FIGS. 25 and 26 diagrammatically illustrate another form of embodiment of the invention, also applicable more particularly to the connection of the outlet of an exhaust manifold to an axial-flow turbine 50, of the same type as the one diagrammatically shown in FIG. 19. In the form of embodiment of FIGS. 25 and 26, the connection between the exhaust manifold and the entrance to the blades 53 of the turbine rotor 52 is by means of a connecting casing 61 substantially frusto-conical in shape and mounted at one end on the frame of the turbine 50, so as to cover the turbine rotor 52, whereas the other end 62 is connected to the exhaust manifold outlet. The purpose of this connecting casing is to maintain constant, or slightly reduce the efficient flow section offered to the exhaust gases, imparting to them at the outlet of the casing the required angle $\alpha$ of attack of the blades 53 of the turbine rotor. This is achieved by means of a substantially conical central vault member 63 arranged within the casing 61 so as to cover by its larger base substantially the hub of the rotor 52 as shown in FIG. 25, and by means of vanes 64 arranged substantially radially between the vault member 63 and the casing 61 and ensuring the required angle of incidence for the attack of the rotor 52 by the gases. This angle $\alpha$ is the one formed between the tangent to the gas-side face of the vane 64 at its gas-exit end and a plane parallel with the plane of the turbine rotor 52.

The vanes 64, which extend to the immediate vicinity of the blades 53 of the turbine rotor 52, may start from different points such as a, b or c. Such different vane lengths allow the conical vault member 63 to be imparted the most suitable shape. The vault member 63 is secured to the casing 61 through the medium of the vanes 64, or it is fastened to the turbine frame, in which case the vanes 64 and the connecting casing 61 may or may not be fastened together.

As mentioned above, the various forms of connection between the manifold outlet and the rotor of an axial-flow supercharger turbine described with reference to FIGS. 18 to 26 allow the kinetic energy of the exhaust gases available at the outlet of the exhaust manifold to be preserved, whereas such kinetic energy is partially lost in the form of heat in the prior-art arrangements, wherein the connection between the manifold and the turbine comprises a diffuser and an exhaust gas intake distributor.

By way of example it will be mentioned that, in the case of an engine with 5 to 9 cylinders per bank, the mean velocity of the exhaust gases at the end of an exhaust manifold is of the order of 0.3 mach in the prior-art arrangements, that it is between 0.3 and 0.45 mach in the device described with reference to FIGS. 1 to 12, and between 0.45 and 0.7 mach in the devices described with reference to FIGS. 18 to 26. It is therefore understood that the advantages gained over the prior art by the arrangements of FIGS. 1 to 12 can thus be preserved and even improved.

Lastly, it will be noted that the invention is applicable to both four-stroke engines and two-stroke engines.

As an example, FIG. 27 illustrates an otherwise completely conventional four-stroke, four cylinder, V-type diesel engine 100 which is equipped with an exhaust manifold 101 for the left bank 102 of cylinders and an exhaust manifold 103 for the right bank 104 of cylinders, the flow section of each of said manifolds being sized according to the provisions of the present invention such that the ratio of the inside diameter of each manifold to the bore diameter of a cylinder is approximately 0.52. This relation is clearly apparent from the right hand cylinder bank 104, which has been partially cut away to show a piston 105 reciprocally positioned in a cylinder 106 and connected to a crankshaft 107 by a connecting rod 108. An intake manifold 109 delivers supercharged air to the top of the cylinder via an intake port 110 and an intake valve 111. Exhaust gases are delivered to the manifold 103 via an exhaust valve 112 and exhaust port 113 and a branch pipe 114. The intake and exhaust valves are operated in the usual manner by rocker arms 115 and 116, respectively, through push rods 117 and a cam shaft 118 driven in synchronism with the crankshaft.

Each exhaust manifold is formed in sections with an integral branch pipe for each section, generally according to the embodiment of FIG. 10. The compact size of the exhaust system resulting from the present invention is dramatically illustrated by FIG. 27 and its attendant structural advantages are readily apparent.

Of course, the invention is by no means limited to the forms of embodiment described and illustrated by way of example only, but comprises all the technical equivalents of the means described if the latter are carried out and used within the scope of the following claims.

What is claimed is:

1. A method for reducing the pressure oscillations in a stream of exhaust gases delivered to a supercharger turbine from a multiple-cylinder bank of an internal combustion engine, the method including connecting an exhaust port of each cylinder in the bank to the inlet end of a corresponding branch pipe, connecting the outlet end of each branch pipe into a single manifold pipe extending alongside the bank of cylinders, and connecting the downstream end of the manifold pipe to the inlet of a supercharger turbine, said connections to the branch pipes and the supercharger turbine constituting the only openings in said manifold pipe, wherein the improvement comprises:

constricting the flow cross section of each branch pipe at a location adjacent to its outlet end relative to the flow cross section of the inlet end of said branch pipe by a ratio in the range from about 0.3 to about 0.8, the constriction being located closely adjacent to the inlet of the branch pipe so as to maintain the potential energy of the exhaust gases flowing in said branch pipe at a high level during the period from opening of the exhaust valve of the cylinder until the piston reaches bottom dead center and providing a substantially uniform flow section throughout the length of the manifold, the diameter of said uniform flow section being smaller than the diameter of each cylinder bore by a ratio in the range from about 0.30 to about 0.75, to provide a high flow velocity of the exhaust gases in the manifold, thereby exerting a strong ejector action on the exhaust gases from each cylinder at the entry from the outlet end of the corresponding branch pipe into the exhaust manifold.

2. A method according to claim 1 further comprising inserting an expanding flow section diffuser between the downstream end of the manifold and the inlet of the supercharger turbine for converting at least a portion of the gas velocity energy at the outlet of the manifold into pressure energy at the inlet to the supercharger turbine.

3. A method according to claim 1 further comprising providing a constant developed gas flow section between the outlet of the manifold and the entry of the supercharger turbine rotor for maintaining at a high level the velocity acquired by the exhaust gases in the manifold.

4. A method according to claim 1 further comprising progressively reducing the gas flow section between the outlet of the manifold and the entry to the supercharger turbine rotor for maintaining substantially constant the velocity acquired by the exhaust gases in the manifold.

5. A method according to claim 4 comprising reducing in a substantially linear manner said gas flow section between the manifold and the turbine rotor.

6. A method according to claim 1 comprising locating said constricted flow section in each branch pipe substantially at the outlet end thereof.

7. A method according to claim 1 further comprising delivering the flow of exhaust gases from the outlet end of each branch pipe into the exhaust manifold in substantially the direction of flow of the gases in said manifold.

8. Apparatus for reducing pressure oscillations in a stream of exhaust gases from an internal combustion engine, the engine having a plurality of cylinders arranged in each of at least one bank of cylinders, a piston in each cylinder, an exhaust port leading from each cylinder, an exhaust valve in each exhaust port, means for opening each exhaust valve during the expansion stroke of the corresponding piston and for closing the exhaust valve after the piston reaches bottom dead center, a single pipe exhaust manifold extending alongside the bank of cylinders, the manifold having an outlet end, a plurality of connecting pipes equal to the number of cylinders in said bank, each connecting pipe having an inlet end connected to the exhaust port of a corresponding cylinder and an outlet end connected to the manifold, said connections to the plurality of connecting pipes and to said supercharger turbine being the only openings for exhaust gas flow in said manifold pipe, and a supercharger turbine connected to the outlet end of the manifold, wherein the improvement comprises:

the outlet end of each connecting pipe being located closely adjacent to its inlet end, and the ratio of the cross-sectional flow area at the outlet end of each connecting pipe to the flow area at the inlet end being in the range from about 0.3 to about 0.8, such that the potential energy of the exhaust gas in the connecting pipe is maintained at a high level during the period from opening of the exhaust valve until the piston reaches bottom dead center, and the manifold pipe having a substantially uniform flow area the diameter of which is less than the diameter of each cylinder bore by a ratio in the range from about 0.30 to about 0.75, such that a high velocity is maintained by the exhaust gases flowing in said manifold piper.

9. Apparatus according to claim 8 wherein the ratio of the flow section at the outlet end to the flow section at the inlet end of each connecting pipe is in the range of about 0.4 to about 0.5.

10. Apparatus according to claim 8 wherein the exhaust manifold flow cross section is substantially circular, and the ratio of the inner diameter of the exhaust manifold to the bore of each cylinder is in the range of about 0.30 to about 0.75.

11. Apparatus according to claim 8 wherein the outlet end of each connecting pipe has an annular flow section.

12. Apparatus according to claim 8 wherein the outlet end of each connecting pipe has a flow section in the form of a segment of an annulus.

13. Apparatus according to claim 8 wherein the manifold is supported directly by the connecting pipes connected to the exhaust ports of the associated cylinders.

14. Apparatus according to claim 8 wherein the manifold comprises a main duct assembled in sections having constant internal diameter, and each connecting pipe comprises a tee including a cylindrical element mounted concentrically with and spaced externally from a section of said manifold, one end of said cylindrical element being connected with said duct and the other end being free and extending slightly beyond a free end of said manifold section, a second cylindrical element opening perpendicularly into the first cylindrical element and connected to the exhaust port of the associated cylinder, and an annular ejector member having one end connected to the adjacent manifold section and the other end connected to the free end of the first cylindrical element.

15. Apparatus according to claim 14 wherein said annular member has a variable internal profile.

16. Apparatus according to claim 8, further comprising a diffuser mounted between the manifold outlet and the supercharger turbine inlet.

17. Apparatus according to claim 8, wherein the outlet of the exhaust manifold is connected directly to the turbine by a conduit having a gas flow section that is constant from the manifold outlet to the turbine rotor.

18. Apparatus according to claim 8, wherein the outlet of the exhaust manifold is connected directly to the turbine by a conduit having a gas flow section that diminishes progressively from the manifold outlet to the turbine rotor.

19. Apparatus according to claim 18 wherein the flow section of said conduit diminishes in a substantially linear fashion.

20. Apparatus according to claim 18 wherein the conduit comprises a gas intake casing of the turbine in the shape of a volute extending over about 360°, the inlet flow section of which is substantially equal to the outlet flow section of the manifold and diminishes progressively to substantially zero at the downstream end outlet of said volute, so that the velocity of approach to the turbine rotor is substantially constant along the entire periphery of the rotor.

21. Apparatus according to claim 18 wherein the engine is a V-engine having two banks of cylinders, and the conduit comprises a gas intake casing of the turbine in the shape of two half-volutes conjoined in prolongation of one another and having two inlets, one inlet being fed with exhaust gases from one cylinder bank of the engine, and the other inlet being fed from the other cylinder bank, each of said half-volutes feeding a corresponding sector of the turbine rotor.

22. Apparatus according to claim 21 wherein the firings of the cylinders in each bank of the engine do not follow one another regularly, and wherein the two half-volutes communicate with one another.

23. Apparatus according to claim 21 wherein the engine has at least 8 cylinders in V-arrangement, in which the firings of the cylinders in each bank follow one another regularly, and wherein the two half-volutes are isolated from one another.

24. Apparatus according to claim 17 wherein the supercharger turbine is an axial flow turbine, and the conduit comprises a substantially frusto-conical connecting casing, the smaller end of which is connected to the manifold and the larger end of which covers the turbine rotor, said connecting casing containing a correspondingly shaped, substantially conical vault member, the larger end of which covers the turbine rotor hub, and vanes arranged substantially radially between said vault member and said connecting casing so as to conduct the exhaust gases at a desired angle of incidence onto the turbine rotor blades.

25. Apparatus according to claim 8 wherein the exhaust manifold comprises several sections arranged end to end and interconnected, each such manifold section being integral with one of the connecting pipes connecting it to a corresponding cylinder.

26. Apparatus according to claim 25 wherein the axis of the outlet end of each connection pipe at its opening into the corresponding manifold section is at an angle of about 30° axis of said manifold section.

* * * * *

UNITED STATES PATENT AND TRADEMARK OFFICE
CERTIFICATE OF CORRECTION

PATENT NO. : 4,288,988  Page 1 of 2
DATED : 15 September 1981
INVENTOR(S) : Remi CURTIL It is certified that error appears in the above—identified patent and that said Letters Patent is hereby corrected as shown below:

Column 3, line 32: after "is used" delete "." and insert --in each case with conventional turbine.--.

Column 5, line 3: after "illustrates" delete "/".

Column 5, line 43: after "one end" insert --(--.

Column 5, line 44: before "the flange" delete parenthesis.

Column 5, line 46: after "beyond" insert --the free--.

Column 5, line 63: after "followed" change "bby" to --by--.

Column 7, line 1: change "compresses" to --comprises--.

UNITED STATES PATENT AND TRADEMARK OFFICE
CERTIFICATE OF CORRECTION

PATENT NO. : 4,288,988   Page 2 of 2
DATED : 15 September 1981
INVENTOR(S) : Remi CURTIL It is certified that error appears in the above—identified patent and that said Letters Patent is hereby corrected as shown below:

Column 7, line 18: change "connecting" to --connection--; change "ccorresponding" to --corresponding--.

Column 10, line 41: change "unefficient" to --inefficient--.

Column 10, line 47: after "resulting" change "an" to --in--.

Column 10, line 67: change "abovedescribed" to --above-described--.

Column 15, line 15: change "piper" to --pipe--.

Column 16, line 15: delete "outlet".

Signed and Sealed this

Twenty-third Day of March 1982

[SEAL]

Attest:

GERALD J. MOSSINGHOFF

Attesting Officer   Commissioner of Patents and Trademarks